United States Patent [19]

Martin et al.

[11] Patent Number: 5,306,203
[45] Date of Patent: Apr. 26, 1994

[54] AUTOMATIC SADDLE LOADER FOR POULTRY LEG PROCESSOR

[76] Inventors: Eugene G. Martin, 840 S. Cocalico Rd., Denver, Pa. 17517; Duane Newswanger, 36 Venture Dr., Holtwood, Pa. 17532

[21] Appl. No.: 976,352

[22] Filed: Dec. 28, 1992

Related U.S. Application Data

[63] Continuation-in-part of Ser. No. 646,949, Jan. 30, 1991, Pat. No. 5,240,454.

[51] Int. Cl.$^5$ .................. A22C 21/00; B65G 29/00
[52] U.S. Cl. .................. 452/182; 452/183; 198/465.4
[58] Field of Search .............. 452/182, 183, 180; 198/465.4, 476.1

[56] References Cited

U.S. PATENT DOCUMENTS

| | | | |
|---|---|---|---|
| 4,071,924 | 2/1978 | Meyn | 452/183 |
| 4,215,654 | 8/1980 | Parker, Jr. | 452/182 |
| 4,570,295 | 2/1986 | Van Mil | 452/182 |
| 4,574,428 | 3/1986 | Meyn | 452/182 |
| 4,658,476 | 4/1987 | Van den Brink | 452/182 |
| 4,709,448 | 12/1987 | McGuire et al. | 452/182 |
| 4,756,056 | 7/1988 | Innes et al. | 452/182 |
| 4,791,704 | 12/1988 | Chapman | 452/182 |
| 5,125,498 | 6/1992 | Meyn | 452/182 |

FOREIGN PATENT DOCUMENTS 259920  3/1988  European Pat. Off. ............ 452/182

*Primary Examiner*—Willis Little
*Attorney, Agent, or Firm*—Shoemaker and Mattare; Ltd.

[57] ABSTRACT

A chicken leg processor includes a transfer device for removing the lower portion of halved birds from a shackle conveyor, and delivering them to the conveyor chain of a cutting apparatus. The transfer device includes a segmented transfer disc which lifts the hocks from the shackles and deposits them in pockets on a horizontal gathering wheel. Subsequently, the hocks are driven out of the pockets by a paddle, and are captured between respective pairs of guide rails entering the cutting apparatus. At this point, the saddles are inverted by an overhead chain which rolls them forward into proper orientation for the cutting devices.

8 Claims, 6 Drawing Sheets

AUTOMATIC SADDLE LOADER FOR POULTRY LEG PROCESSOR

This application is a continuation-in-part of copending application Ser. No. 07/646,949 filed Jan. 30, 1991, now U.S. Pat. No. 5,240,454.

BACKGROUND OF THE INVENTION

This invention relates to the art of butchering, and more particularly to a method and apparatus for processing the legs of chickens and other poultry.

There is interest in automating various aspects of poultry processing that were previously done by hand, and in improving existing equipment, both in terms of product quality and processing speed.

In the field of poultry processing, severing legs from the body of the bird and removing the drumstick from the thigh are two chores that have been difficult to do well automatically, owing to difficult and varying geometry of these portions. Copending prior application Ser. No. 07/649,949 describes an apparatus which was particularly suited to cutting up the lower half of a chicken carcass.

This application describes a modified form of the apparatus; the modifications are at the upstream end of the apparatus (as shown in FIGS. 2-4 of the parent application), where carcasses are automatically transferred from a shackle conveyor to chain conveyors which subsequently move the product through a series of cutting stations.

SUMMARY OF THE INVENTION

Two objects of the invention are to automate the processing of chicken legs, and to reduce the frequency of misfeeds at the upstream end of a leg processing apparatus.

These and other objects of the invention are met by an automatic saddle loader for transferring poultry hocks from a first, linear shackle conveyor, supporting the hocks in a vertical plane, to a gathering wheel having a series of slots in its periphery for receiving the hocks from the shackle conveyor. The device includes a rotatable transfer disc supported on an axis oblique to the direction of movement of the shackle conveyor and intersecting its plane below the level of the hocks. This disc is situated so that its uppermost peripheral portion crosses the path of the hocks and lifts them from the shackles as it pushes them laterally away from the shackle. The disc has a circumferentially spaced array of indentations around its periphery, corresponding to the spacing of the hocks in the shackle conveyor, and a flexible bar passes substantially tangent to both the transfer disc and the gathering wheel, for holding the hocks firmly in their respective indentations until they are seated in the slots of the gathering wheel.

BRIEF DESCRIPTION OF THE DRAWINGS

In the accompanying drawings.

DESCRIPTION OF THE PREFERRED EMBODIMENT

Figure 1:
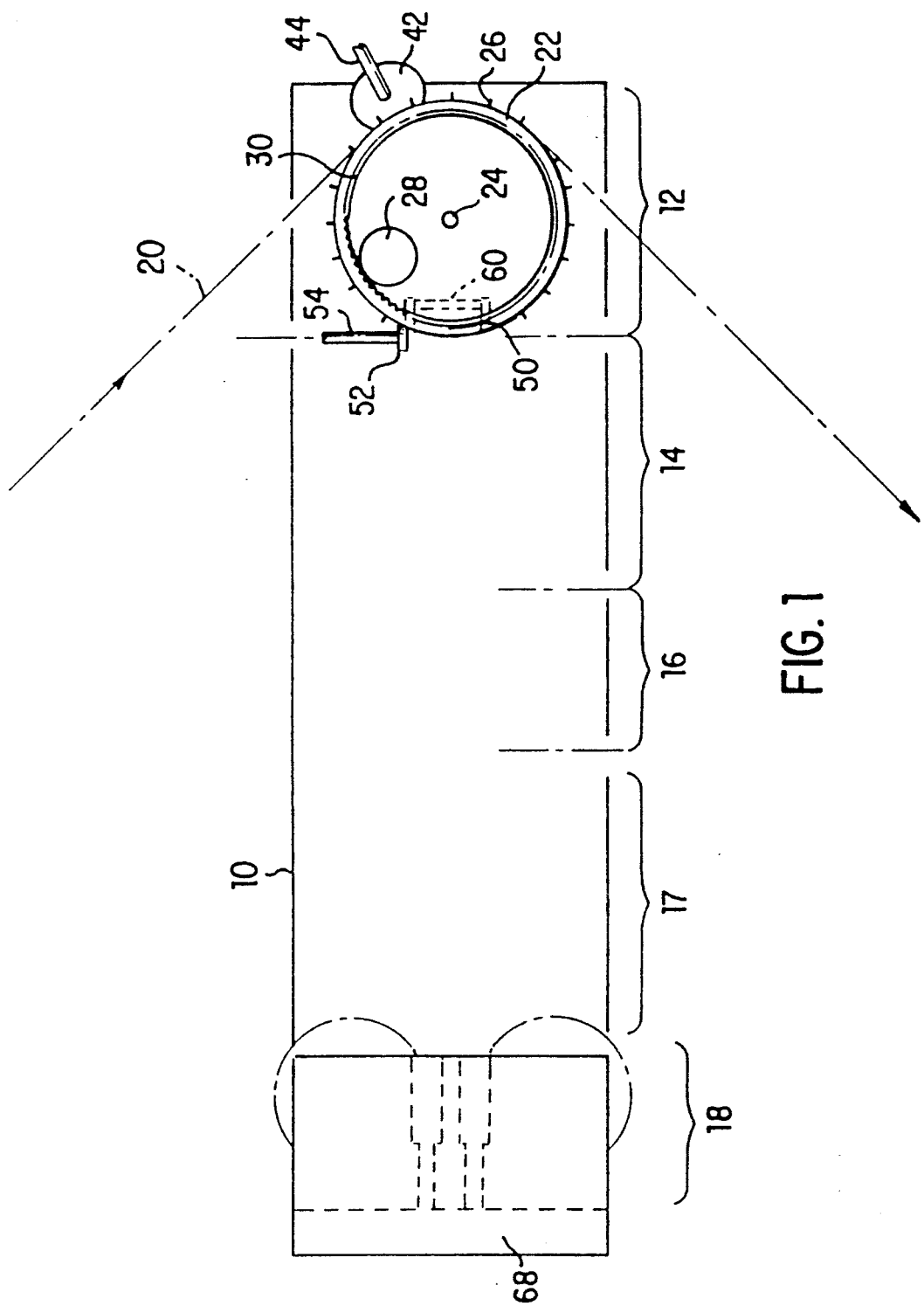
FIG. 1 is a top plan view of an apparatus embodying the invention.

FIG. 1 provides an overall plan view of an apparatus embodying the invention. The apparatus is complex, so in this view, and throughout the drawings, detail not important to an understanding of the invention has been omitted so that the invention can be clearly explained.

The apparatus comprises a frame 10, shown diagrammatically in FIG. 1, which supports the subassemblies of the invention. Breaking the invention down to functional components, there are, in sequence, a transfer unit 12, a nicking unit 14, an inverting unit 16, a tearing unit 17, and a splitting unit 18. The location of each unit is indicated generally in FIG. 1. Arrows denote the direction of product flow through the apparatus. Only the transfer unit is described in detail below.

The transfer unit comprises a conventional shackle conveyor 20 running along a predetermined horizontal path from a location at which birds have been slaughtered, plucked, gutted, and divided into halves. The upper half of each bird (breasts, wings, upper portion of back) has been directed elsewhere, leaving the whole legs interconnected by lower portion of back (together referred to hereafter by the accepted term "saddle") suspended from the shackles by its hocks (the enlarged lower portions corresponding to the human ankle). The apparatus then separates the legs from the back, and finally severs the drumsticks from the thighs. (The severing portion of the apparatus is not new, having been previously patented by the present applicant; nevertheless, it is described herein to give a whole picture of the apparatus.)

When it reaches the present apparatus, the shackle conveyor path passes around a portion (e.g., 90°) of the periphery of a large sprocket 22, which is formed from a horizontal disc of polymeric material such as ultrahigh molecular weight polyethylene, mounted on a vertical main axle 24 supported at either end by bearings (not shown) connected to the frame. The disc has studs 26 protruding from its periphery at intervals corresponding to the pitch of the conveyor, the studs being designed to penetrate openings existing in the shackle conveyor, to interconnect the apparatus and the shackle line. The apparatus could derive its power from the shackle line in this way, but we prefer to provide the apparatus with its own motor 28, so that the conveyor line is not greatly loaded when the apparatus is inserted into it. When the apparatus is self-powered, the studs serve primarily to maintain proper registration between the shackle conveyor and the disc. The motor 28 is a standard hydraulically-driven unit mounted atop the frame on an axis parallel to the main axle, and drives a large polymeric gear 30 atop the disc through a reduction gearset (not shown). Bearings and other details of these components have been omitted from the drawings, for clarity.

Below the sprocket 22, at the level of the hocks in the shackles, there is a peripherally slotted gathering wheel 34 whose lower peripheral edge 36 is undercut at 38 for a purpose described below. The gathering wheel, around its periphery, has a series of pairs of slots whose spacing corresponds to that of the shackles, and whose width (about ⅜ inch) is greater than the leg bones, but narrower than the hocks, so that once the legs are transferred into the slots, the saddles remain supported by the hocks.

The undercut 38 (see FIG. 2) accommodates an arcuate guide bar 41 whose function is to keep the hocks in the slots of the wheel after they have been transferred. The guide bar starts outside the outer diameter of the slotted disc just upstream of the point of tangency between the shackle conveyor and the disc, but otherwise generally lies within the undercut.

Figure 2:
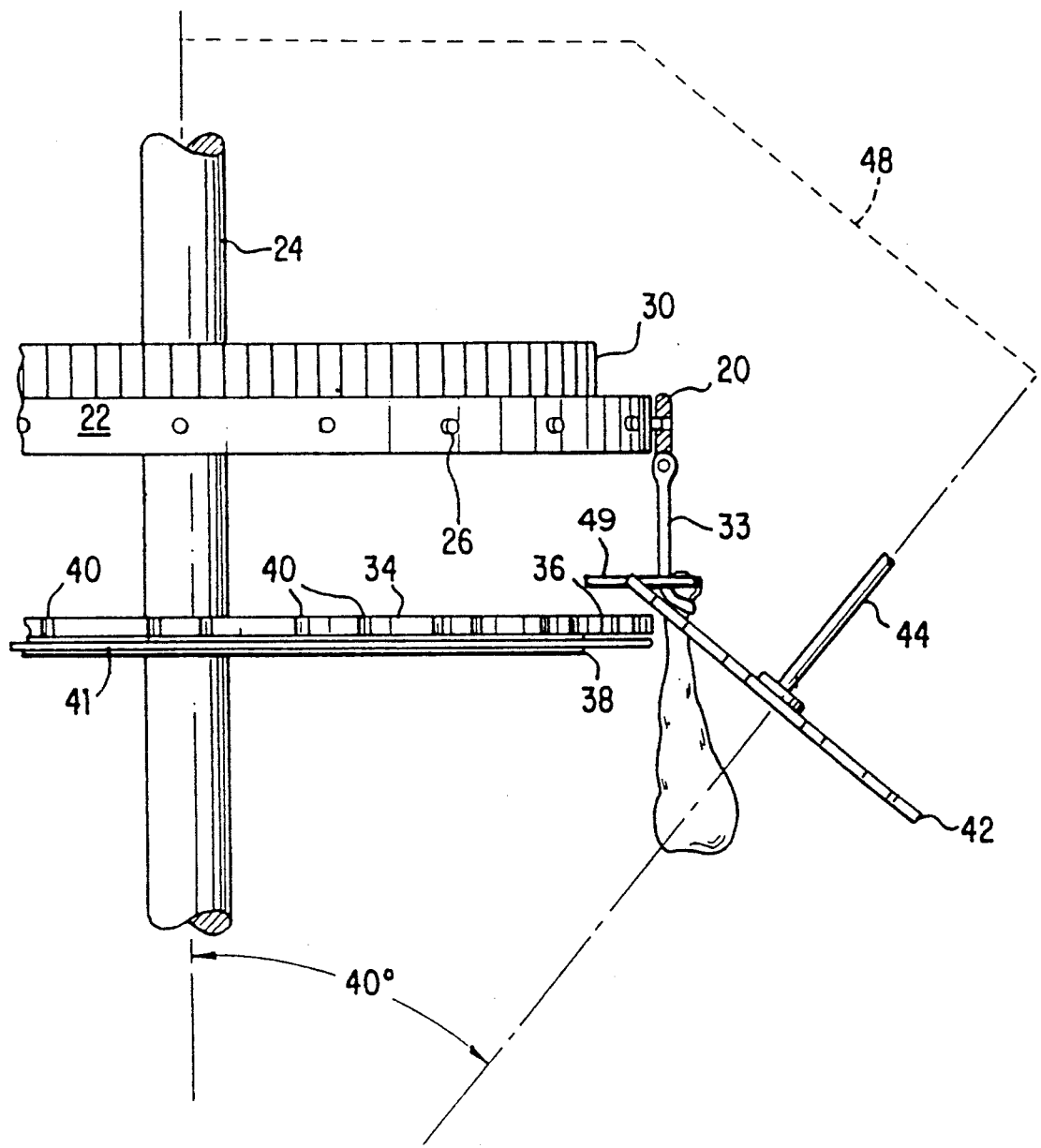
FIG. 2 is a side elevation of a transfer disc shown in FIG. 1.

The shackles are designed, of course, to hold the hocks securely, and prevent strictly lateral withdrawal. The hocks cannot be simply pushed laterally out of the shackles; rather, it is necessary to lift them somewhat first. To do this, the apparatus includes a segmented transfer wheel 42, illustrated in FIGS. 2 and 3. FIG. 2 is a view perpendicular to a plane containing both axes, looking in the upstream direction. Only the edge of the transfer disc is seen in this view, since the shaft 44 which supports the disc lies in a radial plane of the axle, and therefore within the plane of the drawing. The shaft 44 is inclined outwardly with respect to the axle about 40°, to provide both lifting and lateral motion, and intersects the vertical plane of the shackle conveyor below the level of the hocks. The lower surface of the transfer disc just clears the upper edge of the slotted disc, which it overlaps by about an inch.

Figure 3:
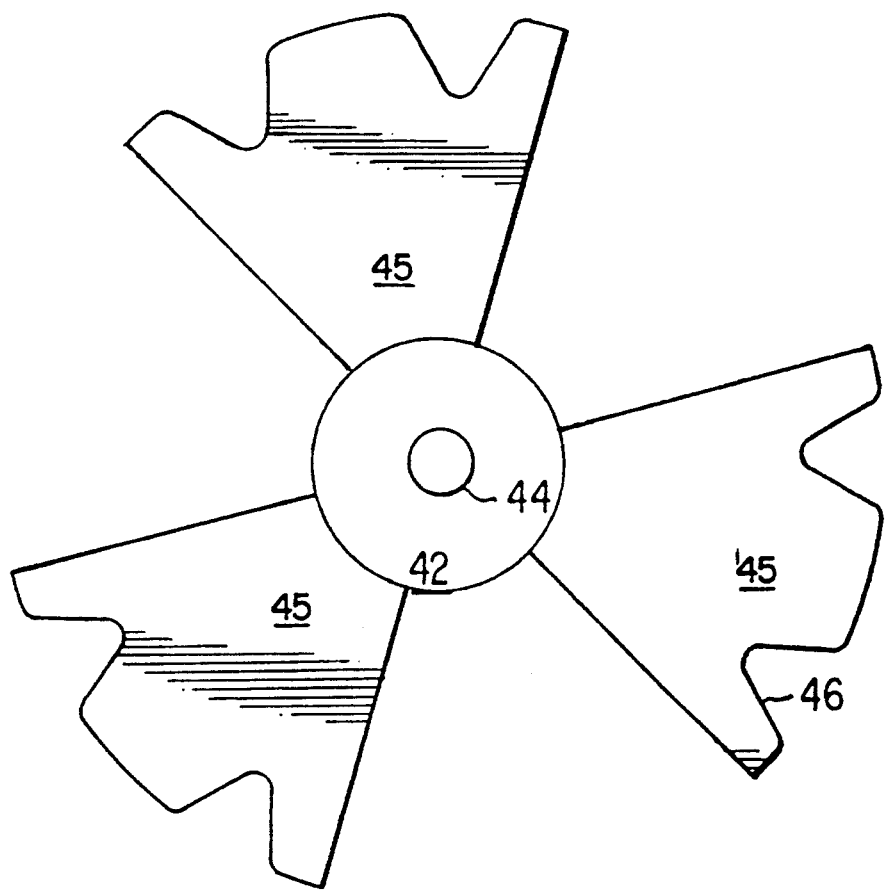
FIG. 3 is an oblique view of the transfer disc of FIG. 2, taken along its axis of rotation.
Figure 5:
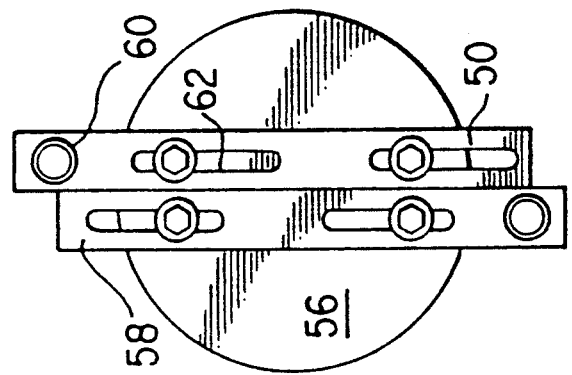
FIG. 5 is an end view thereof.
Figure 4:
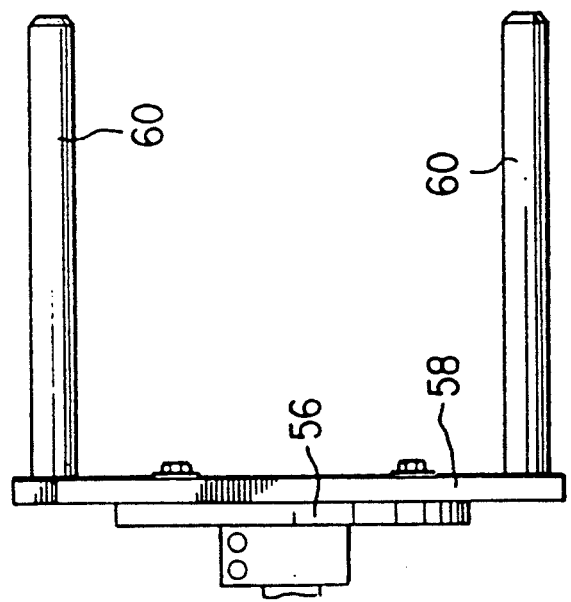
FIG. 4 is a side elevation of a transfer paddle appearing in FIG. 1.

FIG. 3 shows the configuration of the transfer disc, which includes a plurality of like sectors 45, each having indentations 46, each the shape of a 60° "V", with generous radiuses and fillets. The spacing of the indentations equals that of the slots, and the disc shaft is driven at a speed sufficient to make the peripheral speeds of the slotted disc and the transfer disc approximately equal. Power is derived from a power take-off 48, represented diagrammatically by broken lines, which mechanically interconnects the two discs.

The reason for segmenting the transfer wheel is so that only every other saddle is removed from the shackle conveyor. Input can thus be continuously divided between two like processing machines. Alternatively, by changing the segmentation scheme, every third saddle could be removed at a particular processing machine.

For this apparatus, the saddles must be loaded into the shackles so that as they approach the gathering wheel, their tails are uniformly pointed toward the center of the gathering wheel, rather than away from it. The reason for this requirement will become apparent.

An important feature of the invention is the flexible "clicker" bar 49 (FIG. 7), disposed at the periphery of and just above the transfer disc. This bar secures the hocks in the indentations 46 from the time they are first engaged by the transfer disc, until they are safely retained in the pockets of the gathering wheel by element 34. Use of the clicker bar has reduced the frequency of improper transfer by two orders of magnitude.

Saddles which have thus been loaded, and transferred into the gathering wheel, are carried by it to an offloading point 50 shown in FIG. 1. The guide rod terminates just upstream of this point, so that the hocks can be removed from the slots. Directly below the offloading point, there is a paddle device 52 which kicks each saddle laterally outward, by striking the thighs. The paddle device is mounted on a shaft 54 extending laterally of the machine (i.e., horizontally, and perpendicular to the direction of subsequent product flow), the shaft being driven from the main motor by a second mechanical power take-off, again shown diagrammatically. A disc 56 is attached to the inboard end of the shaft, and a pair of L-shaped arms 58, each comprising a slotted bar with a cylindrical rod 60 welded thereto, are bolted to the disc. The slots 62 permit adjustment of the diameter of the paddle path, for different situations. The paddle, like all other moving parts of this invention, is driven continuously in synchronization with the other parts through a power take-off. Motion of the paddle is synchronized with respect to the slotted disc so that it strikes the legs just as the hocks come into registration with respective spaces formed between two pairs of identical, horizontal guide rods 64 that extend away from the slotted disc on either side of a vertical center plane "P" containing the main axle axis. The apparatus is substantially symmetrical on either side of the center plane, except as previously noted.

Within each pair of guide rods, the spacing between rods is sufficient to pass the leg bone, but not the hock; thus, these rods support the hocks during subsequent processing steps.

Since the saddles were originally loaded into the shackles so that their tails would point toward the center of the gathering wheel once they were transferred, the tails face upstream, and the backs down, as the saddles enter the guide rods. They must be reoriented so that the backs are up, and the tails downstream, to be in proper position for cutting. This reorientation is accomplished, without releasing the hocks, by an inverter 70 illustrated in FIGS. 6 and 7.

The inverter includes, in combination, an arcuate horn 72 well below the hock level; the tip of the horn is directed downstream, and is approximately even with the level of the chain conveyor which carries the saddle through the subsequent cutting stations. The upper surface of the horn comprises two wings having a dihedral angle of about 75°, whose purpose is to center the saddle, laterally. Proper lateral registration is essential to optimizing product quality.

Figure 7:
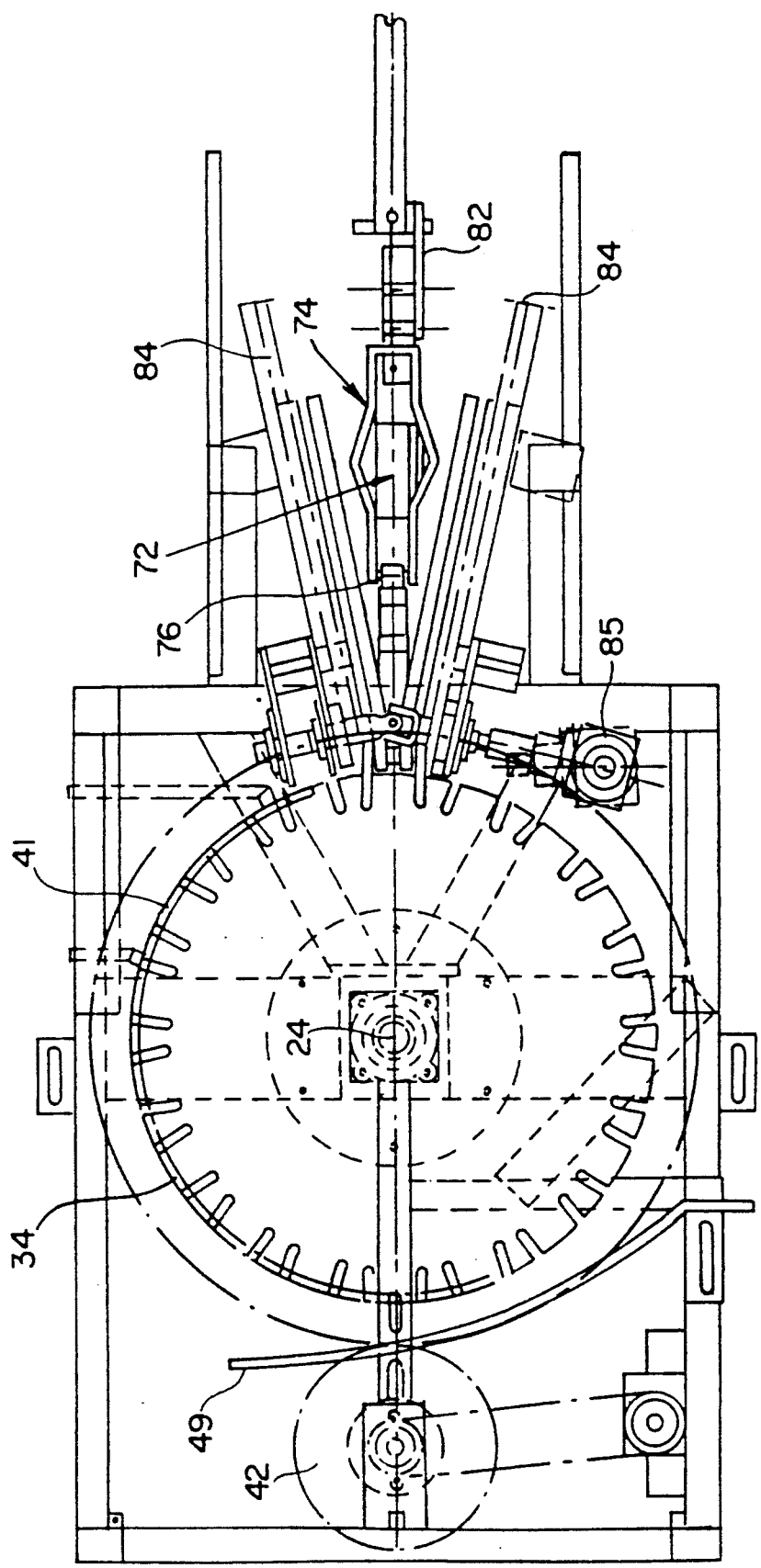
FIG. 7 is a top plan view thereof.

Just above and astride the tip of the horn is a hold down guide 74, comprising a pair of spaced metal rods having a divergent-convergent configuration, as seen in FIG. 7. The hold down guide is pivotally supported at its upper end 76, and is biased downward by a spring (not shown) which allows the saddle to pass underneath.

Figure 6:
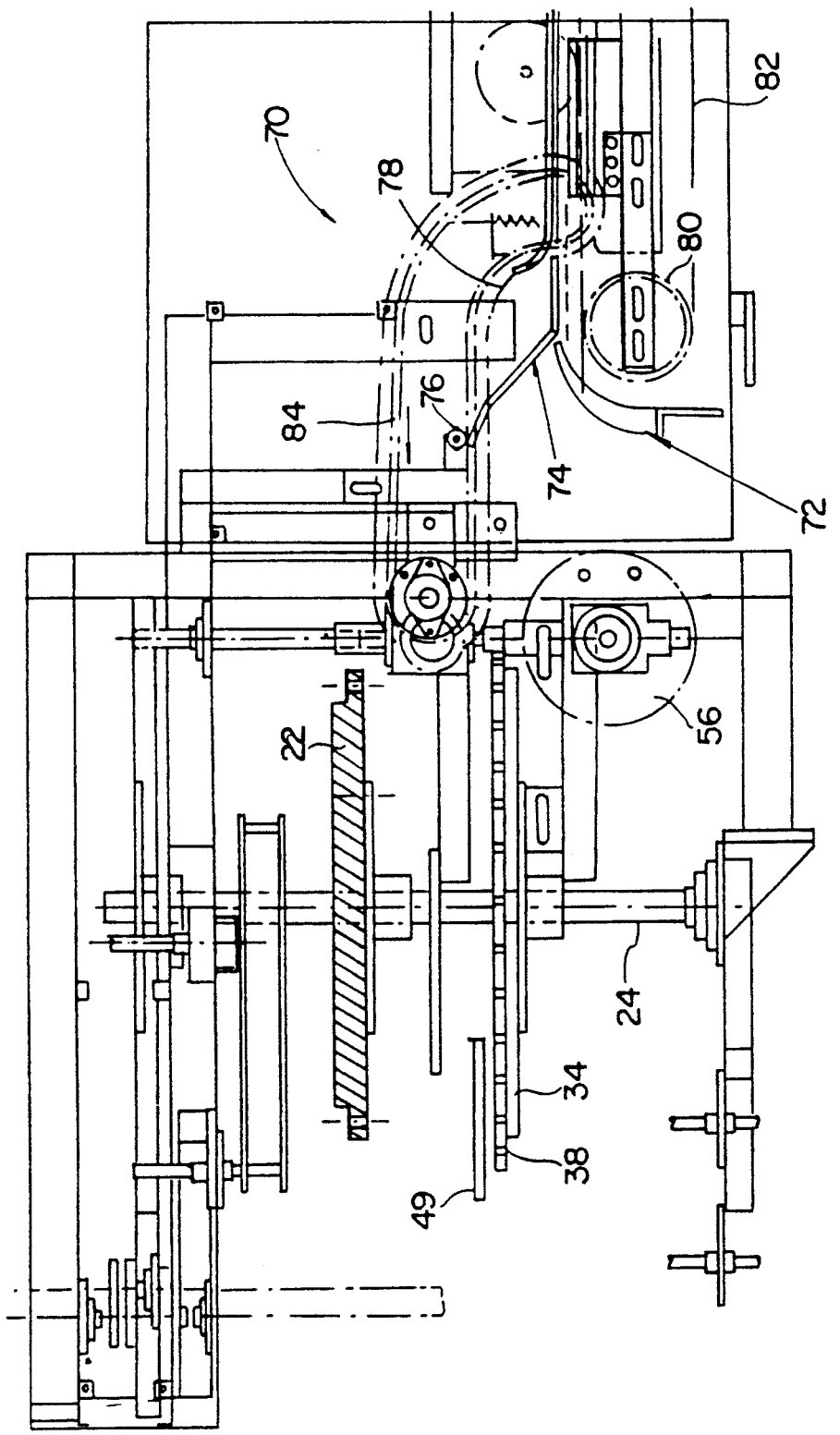
FIG. 6 is a side elevation of a saddle inverter disposed just downstream of the transfer paddle.

The guide rods diverge in the downstream direction, in order to spread the legs as the back is inverted. Their downstream ends bend downward at 78 as they pass over the hold down guide, and terminate above the upstream sprocket 80 of the conveyor 82. The J-shaped loop shown in FIG. 6 represents the paths of two endless inverter chains 84, which diverge as shown in FIG. 7. The chains are driven by a motor or power take-off 85, and having flights which engage the hocks and pull them through the inverter, causing the back to roll forward 180° as it passes between the horn and the hold down guide. The rolling is assisted by the downwardly curved path of the inverter chains. The spacing between the hold down rods, where they diverge, allows the bird's tail to flip forward between them, without being bent back. The subsequent convergence keep the saddle centered by maintaining pressure on the back.

Once the saddle is inverted, the inverter chain directs it onto the surface of the conveyor chain 82, which carries it through the cutting stations.

Inasmuch as the invention is subject to this and other modifications and variations, it is intended that the foregoing description and the accompanying drawings shall be interpreted as illustrative of only one form of the invention, whose scope is to be measured by the following claims.

We claim:

1. A device for transferring poultry hocks from a first, linear shackle conveyor, supporting the hocks in a vertical plane, to a gathering wheel having a series of slots in its periphery for receiving the hocks from the shackle conveyor, said device comprising a rotatable transfer disc supported on an axis oblique to the direction of movement of first conveyor and intersecting said plane below the level of the hocks, the disc being situated so that its uppermost peripheral portion crosses the path of the hocks and lifts them from the shackles as it pushes them laterally away from the conveyor, wherein the disc has a circumferentially spaced array of indentations around its periphery, corresponding to the spacing of the hocks in the shackle conveyor, and further comprising a flexible bar, passing substantially tangent to both the transfer disc and the gathering wheel, for holding the hocks firmly in their respective indentations until they are seated in the slots of the gathering wheel.

2. The invention of claim 1, wherein a plurality of sectors of the disc are removed, so that a portion of the saddles remain on the saddle conveyor for removal by another apparatus.

3. The invention of claim 1, wherein each of said indentations has substantially the shape of a 60° vee.

4. The invention of claim 1, further comprising means for turning the transfer disc on its axis at a peripheral speed about equal to the speed of the shackle conveyor.

5. The invention of claim 1, wherein said second conveyor is a slotted wheel mounted on a vertical axis of rotation.

6. The invention of claim 5, further comprising means for synchronizing movement of said first and second conveyors.

7. The invention of claim 6, wherein said synchronizing means is a series of pins protruding from the periphery of said wheel into engagement with correspondingly spaced structure on said first shackle conveyor.

8. The invention of claim 6, wherein the transfer disc slightly overlaps the periphery of the slotted wheel.

* * * * *